United States Patent Office 3,300,511
Patented Jan. 24, 1967

3,300,511
2-(2',4',6'-TRIMETHYLBENZYL)-IMIDAZOLINE AND SALTS
Karl Zeile, Karl Heinz Hauptmann, and Helmut Stähle, Ingelheim (Rhine), Germany, assignors to Boehringer Ingelheim G.m.b.H., Ingelheim (Rhine), Germany, a corporation of Germany
No Drawing. Filed July 7, 1965, Ser. No. 470,221
Claims priority, application Germany, Nov. 30, 1961, B 64,998
7 Claims. (Cl. 260—309.6)

This is a continuation-in-part of copending application Ser. No. 238,718, filed November 19, 1962, now abandoned.

This invention relates to the novel compound 2-(2',4',6'-trimethylbenzyl)-imidazoline and its non-toxic, pharmacologically acceptable acid addition salts.

It is an object of the invention to provide the novel product 2-(2',4',6'-trimethylbenzyl)-imidazoline, and its non-toxic, pharmacologically acceptable acid addition salts.

This and other objects and advantages of the invention will become obvious from the following detailed description.

The novel products of the invention are 2-(2',4',6'-trimethylbenzyl)-imidazoline of the formula

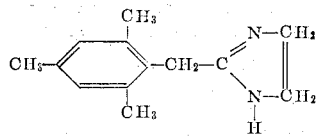

and its non-toxic, pharmacologically acceptable acid addition salts. By various known methods, such as by heating 2,4,6-trimethylbenzyl cyanide with ethylene diamine derivatives, 2-(2',4',6'-trimethylbenzyl)-imidazoline may be prepared and the acid addition salts thereof can be prepared by treatment with the corresponding acids.

Examples of acids suitable to form the non-toxic, pharmacologically acceptable acid addition salts are mineral acids, such as hydrochloric acid, sulfuric acid, nitric acid, and organic acids such as tartaric acid, citric acid, 8-chlorotheophylline and the like. The hydrochloride salt is the preferred form.

The following example illustrates the invention. However, it should be understood that the invention is not intended to be limited to this specific example.

EXAMPLE 1

Preparation of 2-(2',4',6'-trimethylbenzyl)-imidazoline 79 gm. (0.5 mol) of 2,4,6-trimethylbenzylcyanide and 124 gm. (0.6 mol) of ethylenediamine-p-toluene sulfonate were heated for three hours at 200° C. (oil bath temperature) while stirring. After the evolution of ammonia had ceased, the warm reaction mixture was poured over ice (about 400 gm.) and 125 ml. of 5N sodium hydroxide were added whereupon 2-(2',4',6'-trimethylbenzyl)-imidazoline precipitated out. The product was separated by vacuum filtration and was washed with ice water to give 75 gm. (=63% of theory) of the product having a melting point of 153-155° C.

The 2-(2',4',6'-trimethylbenzyl)-imidazoline was dissolved in methanol and the solution was admixed with gaseous hydrogen chloride dissolved in ethanol. After filtering the reaction mixture through charcoal, the solution was admixed with absolute ether until crystallization occurred. After vacuum filtration and recrystallization of the filter cake from a mixture of methanol and ether, 2-(2',4',6'-trimethylbenzyl) - imidazoline hydrochloride having a melting point of 272–277° C. was obtained.

In an analogous fashion, the following acid addition salts of 2-(2',4',6'-trimethylbenzyl)-imidazoline were obtained:

| Acid addition salt: | Melting point, ° C. |
|---|---|
| Nitrate | 167.5–169 |
| Sulfate | 225–228 |
| Tartrate | 124–126.5 |
| Citrate, hygroscopic. | |

The novel compounds according to the present invention, that is, 2-(2',4',6'-trimethylbenzyl)-imidazoline and its non-toxic, pharmacologically acceptable acid addition salts, have useful pharmacodynamic properties. More particularly, they exhibit very effective vasoconstrictive properties in warm-blooded animals without significant undesirable side effects.

Various vasoconstrictive compounds of similar structure are known. For instance, 2-(4'-tert. butyl-2',6'-dimethylbenzyl)-imidazoline hydrochloride is known to produce good vasoconstrictive effects in warm-blooded animals, but at the same time it produces undesirable sedative side effects which restrict its use as a vasoconstrictor.

For pharmaceutical purposes the compounds according to the present invention are administered to warm-blooded animals perorally, parenterally or topically as active ingredients in pharmaceutical compositions, that is, compositions consisting essentially of an inert pharmaceutical carrier and a vasoconstrictive amount of the active ingredient, such as tablets, pills, suspensions, solutions, ointments and the like. Pharmaceutical compositions particularly adapted for topical application to swollen mucous membranes of warm-blooded animals are particularly preferred, and such compositions should advantageously contain from 0.05 to 1.0% by weight, based on the total weight of the composition, of one or more of the compounds according to the present invention.

The following examples illustrate a few pharmaceutical compositions comprising a compound of the present invention as an active vasoconstrictive ingredient.

EXAMPLE 2

Drop solution 0.50 gm. of 2-(2',4',6'-trimethylbenzyl)-imidazoline hydrochloride, 0.270 gm. of citric acid, 3.80 gm. of secondary sodium phosphate and 0.001 gm. of phenyl mercury borate (as an 0.1% solution) were dissolved in that order in 50 cc. of demineralized water and then was mixed with 0.70 gm. of hydroxyethyl cellulose dissolved in sufficient demineralized water to make a total solution of 100 ml. After filtration, there was obtained a 0.5% solution of 2-(2',4',6'-trimethylbenzyl)-imidazoline hydrochloride suitable for topical application to swollen mucous membranes of warm-blooded animals.

In an analogous fashion, solutions of 0.3% and 0.1% respectively, of 2-(2',4',6'-trimethylbenzyl)-imidazoline hydrochloride were prepared from the following groups of ingredients:

0.3% drop solution

| | Gm. |
|---|---|
| 2-(2',4',6'-trimethylbenzyl)-imidazoline·HCl | 0.300 |
| Hydroxyethyl cellulose | 0.700 |
| Secondary sodium phosphate | 4.560 |
| Citric acid | 0.320 |
| Phenyl mercury borate | 0.001 |
| Demineralized water q.s.ad 100 ml. | |

0.1% drop solution

| | |
|---|---|
| 2-(2′,4′,6′-trimethylbenzyl)-imidazoline·HCl | 0.100 |
| Hydroxyethyl cellulose | 0.700 |
| Secondary sodium phosphate | 4.800 |
| Citric acid | 0.330 |
| Phenyl mercury borate | 0.001 |
| Demineralized water q.s.ad 100 ml. | |

EXAMPLE 3

Spray solution 0.50 gm. of 2-(2′,4′,6′-trimethylbenzyl)-imidazoline hydrochloride, 0.27 gm. of citric acid, 3.80 gm. of secondary sodium phosphate and 0.001 gm. of phenyl mercury borate (as a 0.1% solution) were dissolved in that order in a sufficient amount of demineralized water to form a total solution of 100 ml. After filtering, there was obtained a 0.5% solution of 2-(2′,4′,6′-trimethylbenzyl)-imidazoline hydrochloride suitable for spraying onto swollen mucous membranes of warm-blooded animals.

In an analogous fashion, solutions of 0.3% and 0.1%, respectively, of 2-(2′,4′,6′-trimethylbenzyl)-imidazoline hydrochloride were prepared from the following groups of ingredients:

0.3% spray solution

| | Gm. |
|---|---|
| 2-(2′,4′,6′-trimethylbenzyl)-imidazoline·HCl | 0.300 |
| Secondary sodium phosphate | 4.560 |
| Citric acid | 0.320 |
| Phenyl mercury borate | 0.001 |
| Demineralized water q.s.ad 100 ml. | |

0.1% spray solution

| | |
|---|---|
| 2-(2′,4′,6′-trimethylbenzyl)-imidazoline·HCl | 0.100 |
| Secondary sodium phosphate | 4.800 |
| Citric acid | 0.330 |
| Phenyl mercury borate | 0.001 |
| Demineralized water q.s.ad 100 ml. | |

EXAMPLE 4

Ointment 0.30 gm. of 2-(2′,4′,6′-trimethylbenzyl)-imidazoline hydrochloride were dissolved in 9.70 gm. of a vaseline ointment base to obtain an ointment containing 0.3% of the active ingredient.

PHARMACOLOGICAL DATA

A. Constrictive effect on nasal mucous membranes of dogs

The constrictive effects of 2-(2′,4′,6′-trimethylbenzyl)-imidazoline hydrochloride and 2-(4′-tert.butyl-2′,6′-dimethylbenzyl)-imidazoline hydrochloride were determined on the nasal mucous membranes of dogs according to the method of Ardaunet and Binet (Presse med., 1929, pp. 1637–39). The dogs tested were under morphine-chloralose-urethane anesthesia and the compounds to be tested were administered intravenously. At a dose of 1γ/kg., 2-(2′,4′,6′-trimethylbenzyl)-imidazoline hydrochloride had a relative activity of 0.78 when a value of 1.0 was given to the activity of 2-(4′-tert.butyl-2′,6′-dimethylbenzyl)-imidazoline hydrochloride at the same dose. Therefore, the decongestant activity of the two compounds is of the same order of magnitude.

B. Sedative activity

The sedative activity of 2-(2′,4′,6′-trimethylbenzyl)-imidazoline hydrochloride and 2-(4′-tert.butyl-2′,6′-dimethylbenzyl)-imidazoline hydrochloride was determined by comparing the extension of the duration of sleep induced by Evipan according to the method of Winter (J. Pharmacol. Exper. Therap., vol. 94, 1948, p. 7). 50 mg./kg. of the test compounds in solution were administered per os to white mice thirty minutes prior to the administration of a dose of 100 mg./kg. of Evipan sodium intraperitoneally. The percentage prolongation of the period of time to reoccurrence of the spinal rotation reflex and the righting reflex was calculated in comparison to white mice which were simultaneously treated only with Evipan sodium, and the results are summarized in Table I:

TABLE I

| Test Compound | Prolongation of Spinal Rotation Reflex in Percent | Rate of Righting Reflex in Percent |
|---|---|---|
| 2-(2′,4′,6′-trimethylbenzyl)-imidazoline hydrochloride | +21 | +4 |
| 2-(4′-tert.butyl-2′,6′-dimethylbenzyl)-imidazoline hydrochloride | +94 | +90 |

2-(2′,4′,6′-trimethylbenzyl)-imidazoline hydrochloride has substantially no sedative effect in contrast to 2-(4′-tert.butyl-2′,6′-dimethylbenzyl)-imidazoline hydrochloride, as can be easily seen from Table I.

C. Toxicity

The acute toxicity of 2-(4′-tert.butyl-2′,6′-dimethylbenzyl)-imidazoline hydrochloride and 2-(2′,4′,6′-trimethylbenzyl)-imidazoline hydrochloride was tested in white mice when administered subcutaneously and per os. The average lethal doses ($LD_{50}$) were calculated by the method of Kärber (Arch. Exper. Path. Pharmcol., vol. 162, 1931, p. 480) and are summarized in Table II:

TABLE II

| Test Compound | $LD_{50}$ Subcutaneously, mgm./kg. | $LD_{50}$ Per os, mgm./kg. |
|---|---|---|
| 2-(2′,4′,6′-trimethylbenzyl)-imidazoline hydrochloride | 107.5 | 210 |
| 2-(4′-tert.butyl-2′,6′-dimethylbenzyl)-imidazoline hydrochloride | 36 | 64.5 |

From these numerical values, it is evident that 2-(2′,4′,6′-trimethylbenzyl)-imidazoline has a substantially lower toxicity than the prior art compound.

Various modifications of the invention may be made without departing from the spirit or scope thereof, and it is to be understood that the invention is to be limited only as defined in the appended claims.

We claim:

1. A compound selected from the group consisting of 2-(2′,4′,6′-trimethylbenzyl)-imidazoline and its nontoxic, pharmacologically acceptable acid addition salts.

2. 2-(2′,4′,6′-trimethylbenzyl)-imidazoline.

3. 2-(2′,4′,6′-trimethylbenzyl)-imidazoline hydrochloride.

4. 2-(2′,4′,6′-trimethylbenzyl)-imidazoline nitrate.

5. 2-(2′,4′,6′-trimethylbenzyl)-imidazoline sulfate.

6. 2-2′,4′,6′-trimethylbenzyl)-imidazoline citrate.

7. 2-(2′,4′,6′-trimethylbenzyl)-imidazoline tartrate.

References Cited by the Examiner

UNITED STATES PATENTS 2,161,938  6/1939  Sonn _____ 260—453 X
2,868,802  1/1959  Hueni _____ 260—309.6

N. S. MILESTONE, *Acting Primary Examiner.*

JOHN D. RANDOLPH, *Examiner.*

NATALIE TROUSOF, *Assistant Examiner.*